United States Patent
Shih et al.

(10) Patent No.: US 6,792,415 B2
(45) Date of Patent: Sep. 14, 2004

(54) METHOD AND SYSTEM FOR DOCUMENT CLASSIFICATION WITH MULTIPLE DIMENSIONS AND MULTIPLE ALGORITHMS

(75) Inventors: Hsin-Te Shih, Taipei (TW); Wen-Chih Chen, Tainan (TW); Han-Chao Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 465 days.

(21) Appl. No.: 10/067,672

(22) Filed: Feb. 4, 2002

(65) Prior Publication Data

US 2003/0014388 A1 Jan. 16, 2003

(30) Foreign Application Priority Data

Jul. 12, 2001 (TW) .................................... 90130326 A

(51) Int. Cl.⁷ ............................................ G06F 17/30
(52) U.S. Cl. .............................................. 707/2; 707/10
(58) Field of Search ........................ 707/2, 5, 10, 100, 707/101, 101.1; 382/176, 180, 190, 224; 706/45, 52; 700/83; 704/5, 9, 10, 256; 709/201; 715/503

(56) References Cited

U.S. PATENT DOCUMENTS

| | | | | |
|---|---|---|---|---|
| 5,765,029 A | * | 6/1998 | Schweid et al. | 706/52 |
| 6,442,555 B1 | * | 8/2002 | Shmueli et al. | 707/101 |
| 6,611,825 B1 | * | 8/2003 | Billheimer et al. | 706/45 |
| 6,751,621 B1 | * | 6/2004 | Calistri-Yeh et al. | 707/100 |

OTHER PUBLICATIONS

Wen–Lin Hsu et al., Classification Algorithms for NET-NEWS Articles, 1999, ACM, pp. 114–121.*

* cited by examiner

Primary Examiner—Diane D. Mizrahi
Assistant Examiner—Apu Mofiz
(74) Attorney, Agent, or Firm—Thomas, Kayden, Horstemeyer & Risley

(57) ABSTRACT

A system for document classification with multiple dimensions and multiple algorithms. The system includes a preference database, a generator, and a classification unit. The preference database stores at least one classification preference. The classification preference includes a plurality of categories, each of which has a corresponding algorithm. The generator transforms the classification preference into a classification code. The classification unit executes the classification code to classify the document, thus one or several detailed catalogues corresponding to each of the categories are acquired.

10 Claims, 5 Drawing Sheets

METHOD AND SYSTEM FOR DOCUMENT CLASSIFICATION WITH MULTIPLE DIMENSIONS AND MULTIPLE ALGORITHMS

BACKGROUND OF THE INVENTION

1. Field of the Invention

The present invention relates to a method and system for document classification, and particularly to a method and system for document classification that employs multiple algorithms to classify documents in multiple dimensions.

2. Description of the Related Art

In current document classification mechanism, the method for document classification always belongs to a single dimension classification method. That is, one document is classified into one or multiple detailed catalogues by employing one classification algorithm. Since only one algorithm is employed in the classification procedure, the document is classified according to its most noticeable feature, such as a keyword having maximum appearances or the similarity of the document.

However, features considered important but not paramount may not be classified and extracted. For example, the author of the document cannot be classified, since the name of the author only appears in the cover page. In addition, the technique in a system analysis document also cannot be classified, since the analysis is more important than the technique in the document.

FIG. 1 is a schematic diagram showing an example of classification structure 100 of the documents in an enterprise. The classification structure 100 includes four categories, "Author" 110, "Classification" 120, "Analysis Method" 130, and "Application Area" 140. Category "Author" 110 includes detailed catalogues, "Employee A" 111 and "Employee B" 112; Category "Classification" 120 includes detailed catalogues, "Requirement Specification" 121 and "Design Specification" 122; Category "Analysis Method" 130 includes detailed catalogues, "SDG2 Analysis" 131 and "Use Case Analysis" 132; and Category "Application Area" 140 includes detailed catalogues, "Catalog Service" 141 and "Supply Chain Management" 142.

As an example, the requirement of a catalog service is described in a specification, and the word "Catalog Service" is mentioned repeatedly in this specification, the author of the specification, "Employee A", and the word "Requirement Specification" only appear in the cover page, and the word "Analysis Method" only appears once in one section of the specification. In conventional methods, since the feature of "Catalog Service" is stronger than the feature of "Employee A", "Requirement Specification" and/or "Analysis Method", the specification is only classified into the detailed catalogues, "Catalog Service" 141, as shown in FIG. 2 (denoted by the black circle). However, the features of "Employee A", "Requirement Specification" and/or "Analysis Method" are not taken into consideration.

SUMMARY OF THE INVENTION

It is therefore an object of the present invention to provide a method and system for document classification with multiple dimensions and multiple algorithms. Users can set categories (dimensions) and the corresponding algorithms according to the characteristics of documents, so as to employ these algorithms to classify documents in respective dimensions.

To achieve the above objects, the present invention provides a method for document classification with multiple dimensions and multiple algorithms. According to one aspect of the invention, first, a classification preference is set. The classification preference includes a plurality of categories, and each of the categories has a corresponding algorithm. Then, a document is classified according to the classification preference, thus one or several detailed catalogues corresponding to each of the categories are acquired.

According to another aspect of the invention, first, a document is received, and a classification code is determined. The classification code contains a classification preference. The classification preference includes a plurality of categories, and each of the categories has a corresponding algorithm. Then, the classification code is executed to classify the document, thus one or several detailed catalogues corresponding to each of the categories are acquired.

According to the embodiment of the present invention, a system for document classification with multiple dimensions and multiple algorithms is also provided. The system includes a preference database, a generator, and a classification unit. The preference database stores at least one classification preference. The classification preference includes a plurality of categories, and each of the categories has a corresponding algorithm. The generator transforms the classification preference into a classification code. The classification unit executes the classification code to classify the document, thus one or several detailed catalogues corresponding to each of the categories are acquired.

It should be noted that the document is classified in each of the categories by employing the algorithms corresponding to the categories respectively.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
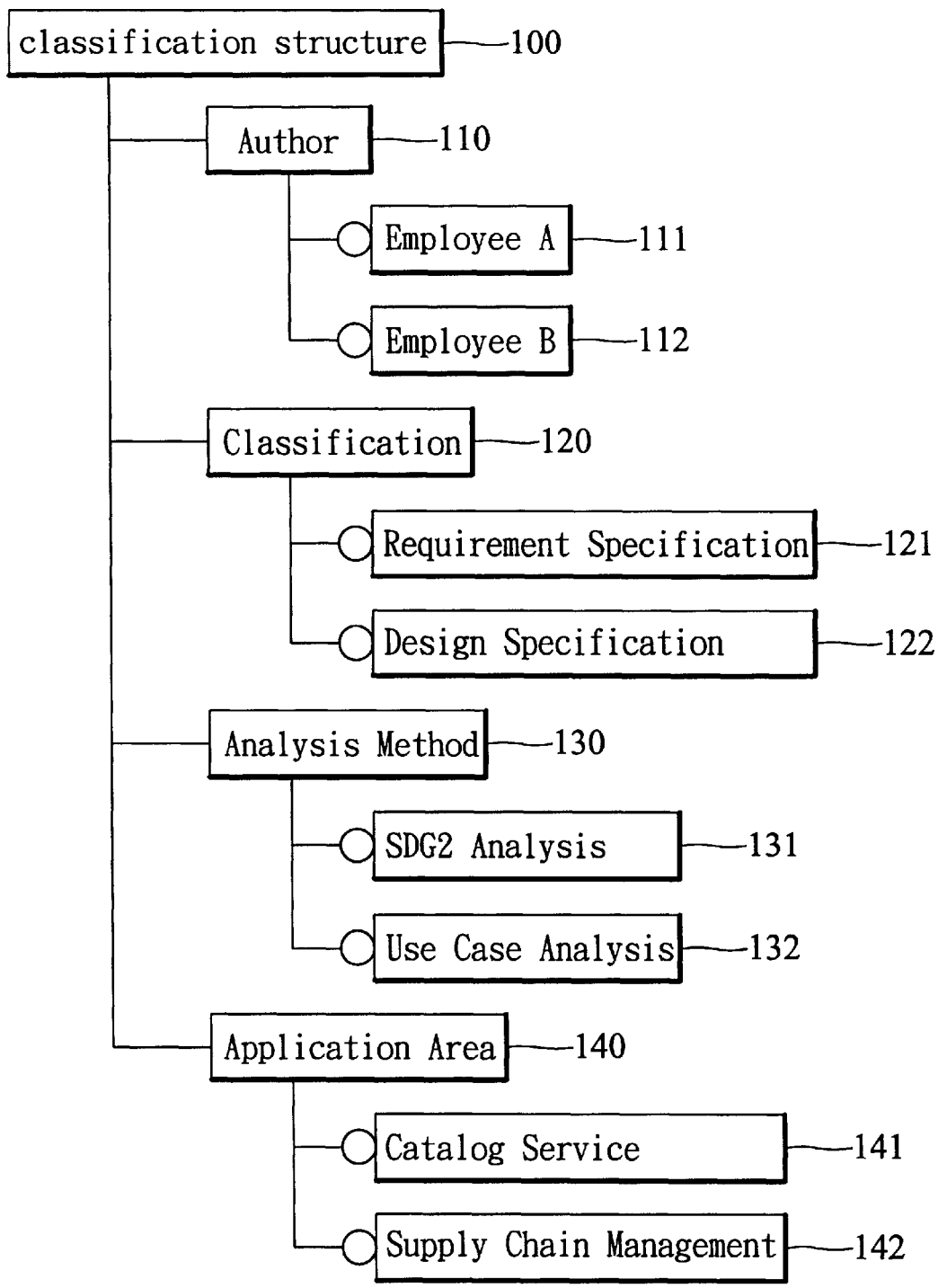
FIG. 1 is a schematic diagram showing an example of classification structure of the documents in an enterprise.
Figure 2:
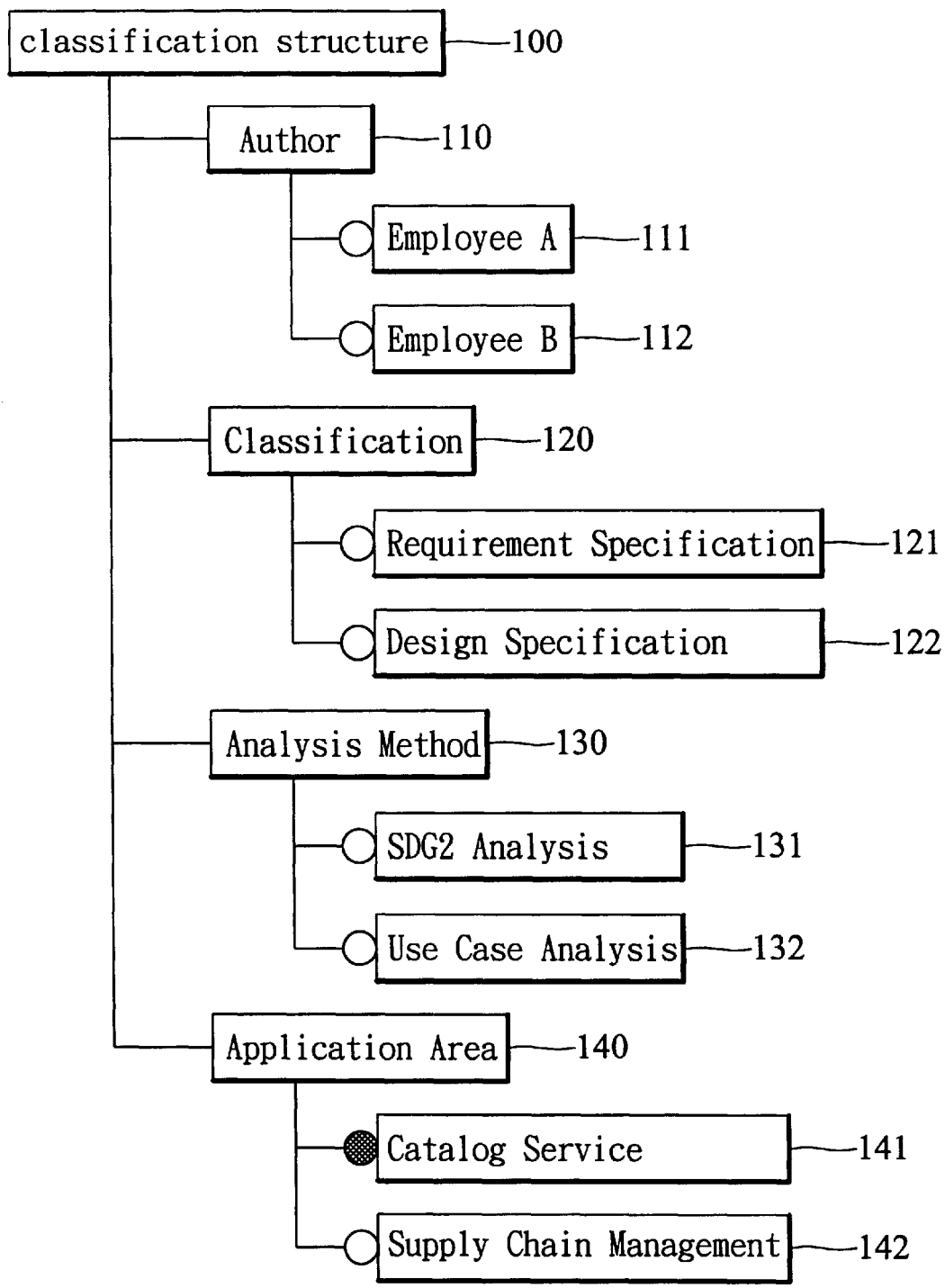
FIG. 2 is a schematic diagram showing a classification result of a Requirement Specification according to the conventional method.
Figure 3:
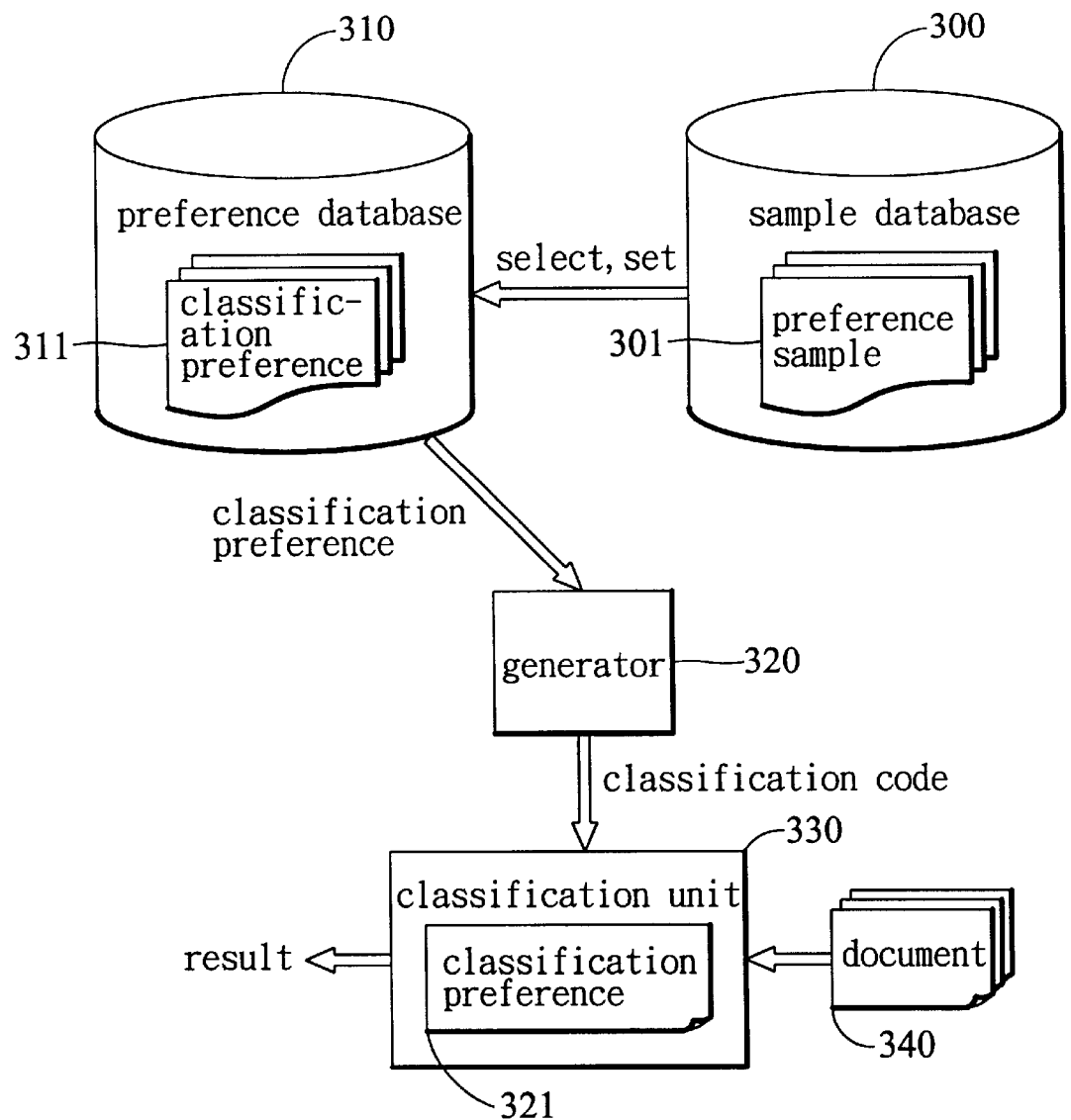
FIG. 3 is a schematic diagram showing the system structure of a system for document classification with multiple dimensions and multiple algorithms according to the embodiment of the present invention.

FIG. 3 shows the system structure of a system for document classification with multiple dimensions and multiple algorithms according to the embodiment of the present invention. Referring to FIG. 3, the system includes a sample database 300, a preference database 310, a generator 320, and a classification unit 330.

The sample database 300 stores several preference samples 301 for various types of documents. The preference database 310 stores several classification preferences 311. The preference sample 301 and classification preference 311 may include a plurality of categories (not shown in FIG. 3), and each of the categories has a corresponding algorithm and related parameters (not shown in FIG. 3). When a classification is expected, a user can set the classification preference 311 in the preference database 310 directly, or select and/or modify an appropriate preference sample 301 from the sample database 300.

It should be noted that the algorithm can be set according to the property of its corresponding category, for example, the algorithm may be the dictionary comparison method if the category is "Author" 110 or "Classification" 120; the algorithm may be the statistics method if the category is "Analysis Method" 130; and the algorithm may be the concept comparison method if the category is "Application Area" 140. In addition, these algorithms may be set to related parameters, such as sensitivity or accuracy.

The generator 320 transforms the classification preference 311 in the preference database 310 into a classification code 321. The classification code 321 may be a batch program, such as "MACRO" (not limited thereto).

The classification unit 330 may receive several documents 340, and execute the classification code 321 generated by the generator 320 to classify these documents, thus as detailed catalogues corresponding to each of the categories can be acquired.

Figure 4:
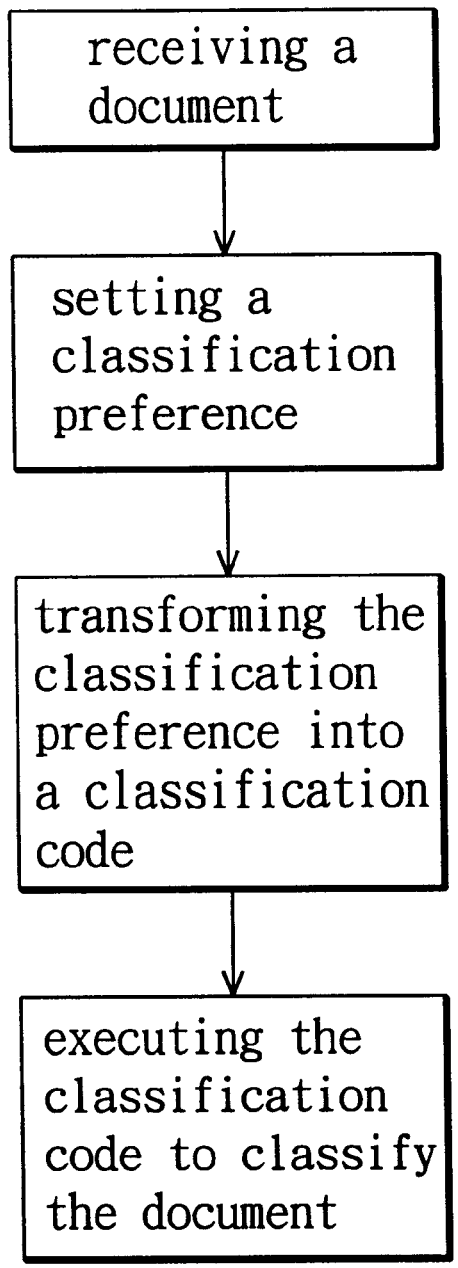
FIG. 4 is a flow chart illustrating the operation of a method for document classification with multiple dimensions and multiple algorithms according to the embodiment of the present invention.

Next, FIG. 4 shows the operation of a method for document classification with multiple dimensions and multiple algorithms according to the embodiment of the present invention.

First, in steps S400, a document 340 is received by the classification unit 330, as indicated by users. Then, in step S402, a classification preference 311 is set by setting the classification preference 311 in the preference database 310 directly, or selecting and/or modifying an appropriate preference sample 301 from the sample database 300.

When the classification preference 311 has been set, in step S404, a classification code 321 is determined by transforming the classification preference 311 in the preference database 310. Finally, in step S406, the classification code 321 is executed to classify the document 340, thus one or several detailed catalogues corresponding to each of the categories can be acquired.

The preference sample 301 and classification preference 311 may include a plurality of categories, and each of the categories has a corresponding algorithm and related parameters. In addition, in step S406, the document is classified in each of the categories by employing the algorithms corresponding to the categories respectively.

It should be noted that the object of transforming the classification preference 311 into the classification code 321 in step S402 is to improve the efficiency of classification. When a large amount of documents need to be classified, the user can only set the classification preference 311 once, and execute the same classification code 321 to classify these documents.

Figure 5:
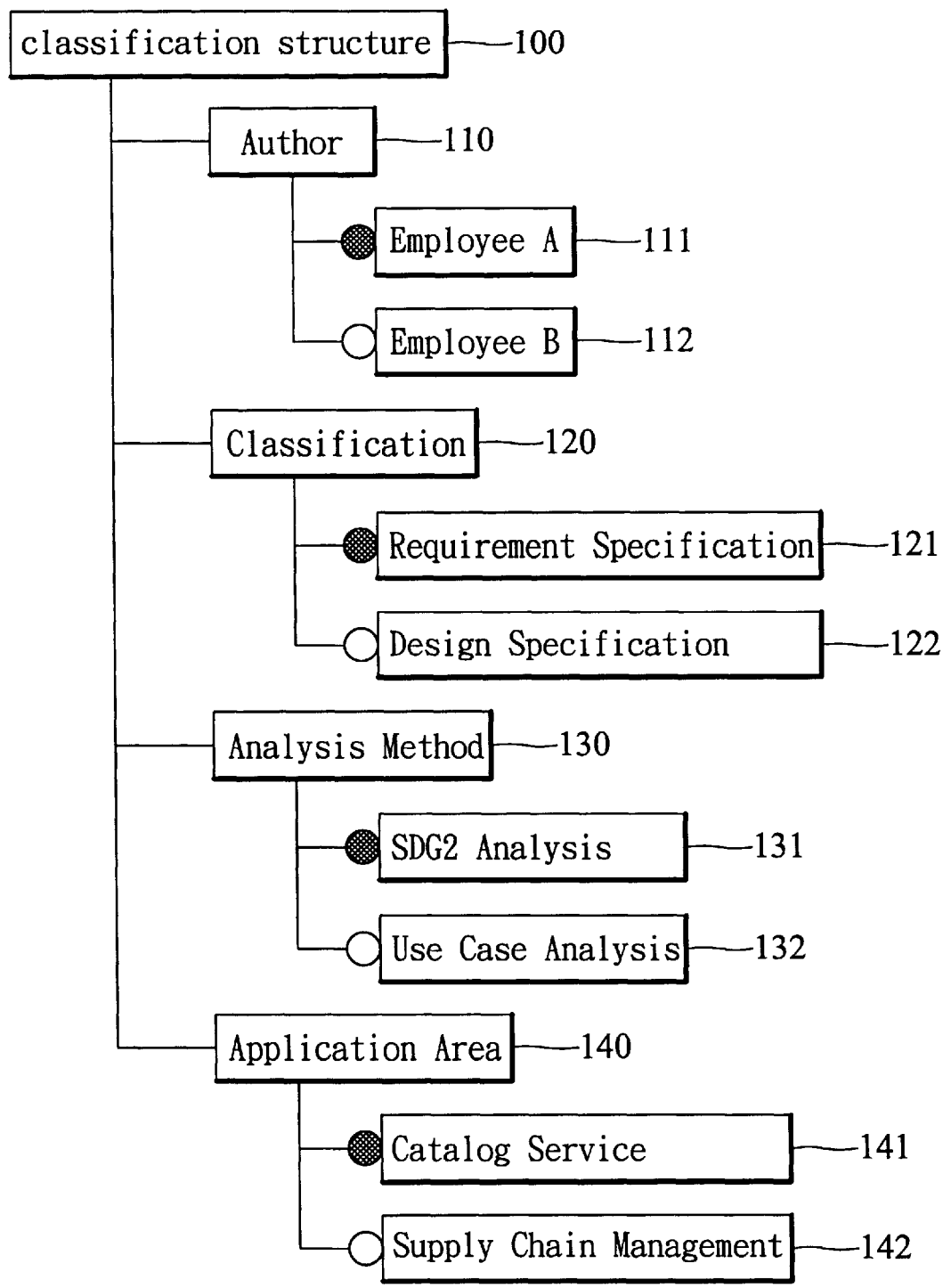
FIG. 5 is a schematic diagram showing a classification result of a Requirement Specification according to the embodiment of the present invention.

Similarly, as an example, the requirement of a catalog service is described in a specification, and the word "Catalog Service" is mentioned repeatedly in this specification. The author of the specification, "Employee A", and the term "Requirement Specification" only appear in the cover page, and the word "Analysis Method" only appears once in one section of the specification. FIG. 5 shows the classification result of the Requirement Specification according to the embodiment of the present invention.

As shown in FIG. 5, the specification is classified into the detailed catalogue "Employee A" 111 responding to the category "Author" 110, the detailed catalogue "Requirement Specification" 121 responding to the category "Classification" 120, the detailed catalogue "SDG2 Analysis" 131 responding to the category "Analysis Method" 130, and the detailed catalogue "Catalog Service" 141 responding to the category "Application Area" 140.

In FIG. 5, the categories, "Author" 110, "Classification" 120, "Analysis Method" 130, and "Application Area" 140 represent a dimension each, respectively, and the document can be classified in each of the dimensions independently.

As a result, the method and system for document classification with multiple dimensions and multiple algorithms according to the present invention can set categories (dimensions) and the corresponding algorithms according to the characteristic of documents, so as to employ these algorithms to classify documents in respective dimensions, thus most of the features of the document can be taken into consideration in classification.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for document classification with multiple dimensions and multiple algorithms, comprising the steps of:
    setting a classification preference, wherein the classification preference comprises a plurality of categories, and each of the categories has a corresponding algorithm; and
    classifying a document according to the classification preference, such that one or several detailed catalogues corresponding to each of the categories are acquired.

2. The method as claimed in claim 1 wherein the document is classified in each of the categories by respectively employing the algorithms corresponding to the categories.

3. The method as claimed in claim 1 further setting the accuracy of each of the algorithms.

4. The method as claimed in claim 1 further transforming the classification preference into a classification code to classify the document by executing the classification code.

5. A method for document classification with multiple dimensions and multiple algorithms, comprising the steps of:
    receiving a document;
    determining a classification code, wherein the classification code is transformed from a classification preference, the classification preference comprises a plurality of categories, and each of the categories has a corresponding algorithm; and
    executing the classification code to classify the document, such that one or several detailed catalogues corresponding to each of the categories are acquired.

6. The method as claimed in claim 5 wherein the document is classified in each of the categories by respectively employing the algorithms corresponding to the categories.

7. The method as claimed in claim 5 further setting the accuracy of each of the algorithms.

8. A system for document classification with multiple dimensions and multiple algorithms, comprising:

a preference database for storing at least one classification preference, wherein the classification preference comprises a plurality of categories, and each of the categories has a corresponding algorithm;

a generator for transforming the classification preference into a classification code; and a classification unit for receiving a document and executing the classification code to classify the document, such that one or several detailed catalogues corresponding to each of the categories are acquired.

9. The system as claimed in claim 8 wherein the document is classified in each of the categories by respectively employing the algorithms corresponding to the categories.

10. The system as claimed in claim 8 wherein each of the categories has an accuracy of the corresponding algorithm.

* * * * *